(12) United States Patent
Huxham et al.

(10) Patent No.: US 10,332,081 B2
(45) Date of Patent: Jun. 25, 2019

(54) PIN ENTRY FOR INTERNET BANKING ON MEDIA DEVICE

(71) Applicant: VISA INTERNATIONAL SERVICE ASSOCIATION, San Francisco, CA (US)

(72) Inventors: Horatio Huxham, Cape Town (ZA); Alan Joseph O'Regan, Cape Town (ZA)

(73) Assignee: Visa International Service Association, San Francisco, CA (US)

( * ) Notice: Subject to any disclaimer, the term of this patent is extended or adjusted under 35 U.S.C. 154(b) by 751 days.

(21) Appl. No.: 14/382,757

(22) PCT Filed: Mar. 15, 2013

(86) PCT No.: PCT/US2013/032312
§ 371 (c)(1),
(2) Date: Sep. 3, 2014

(87) PCT Pub. No.: WO2013/138757
PCT Pub. Date: Sep. 19, 2013

(65) Prior Publication Data
US 2015/0046335 A1    Feb. 12, 2015

Related U.S. Application Data

(60) Provisional application No. 61/611,792, filed on Mar. 16, 2012.

(51) Int. Cl.
*G06Q 20/10* (2012.01)
*G06Q 40/02* (2012.01)
(Continued)

(52) U.S. Cl.
CPC ....... *G06Q 20/108* (2013.01); *G06Q 20/3227* (2013.01); *G06Q 20/3229* (2013.01);
(Continued)

(58) Field of Classification Search
USPC .......................................... 705/64
See application file for complete search history.

(56) References Cited

U.S. PATENT DOCUMENTS 5,973,756 A * 10/1999 Erlin .................... G06Q 20/341
348/734
6,219,109 B1 * 4/2001 Raynesford ............ H04N 7/088
340/12.22
(Continued)

FOREIGN PATENT DOCUMENTS

| KR | 10-2005-0052439 A | 6/2005 |
| KR | 10-2008-0025799 A | 3/2008 |
| WO | 2012/014185 A1 | 2/2012 |

OTHER PUBLICATIONS

International Search Report and Written Opinion dated Jun. 26, 2013 for International Patent Application No. PCT/US13/32312, 14 pages.

*Primary Examiner* — Steven S Kim
*Assistant Examiner* — Timothy Paul Sax
(74) *Attorney, Agent, or Firm* — Kilpatrick Townsend & Stockton LLP

(57) ABSTRACT

Embodiments of the invention disclose a remote control device for operating a media device that can be used to conduct financial transactions. The remote control device includes a user interface to accept user input, and a communication interface to communicate with the media device. The remote control device also includes a hardware security module that is coupled to the user interface and the communication interface. The hardware security module includes a secure processing unit, and a public processing unit that is configured to selectively request the secure processing unit to encrypt user input based on a function that is being performed on the media device.

17 Claims, 6 Drawing Sheets

(51) Int. Cl.
*G06Q 20/32* (2012.01)
*G06Q 20/38* (2012.01)
*G06Q 20/40* (2012.01)
*H04N 5/44* (2011.01)
*H04N 21/422* (2011.01)
*H04N 21/4367* (2011.01)
*H04N 21/475* (2011.01)
*H04N 21/478* (2011.01)

(52) U.S. Cl.
CPC ....... *G06Q 20/382* (2013.01); *G06Q 20/3829* (2013.01); *G06Q 20/4012* (2013.01); *G06Q 40/02* (2013.01); *H04N 5/4403* (2013.01); *H04N 21/42222* (2013.01); *H04N 21/4367* (2013.01); *H04N 21/4753* (2013.01); *H04N 21/47805* (2013.01); *H04N 2005/4428* (2013.01)

(56) References Cited

U.S. PATENT DOCUMENTS

| | | | | |
|---|---|---|---|---|
| 6,378,072 B1* | 4/2002 | Collins | ................ | G06F 21/572 713/161 |
| 6,396,612 B1* | 5/2002 | Bjorndahl | ........... | H04L 63/0492 340/3.43 |
| 6,407,779 B1* | 6/2002 | Herz | ................ | H04N 5/44513 340/12.3 |
| 7,386,869 B1 | 6/2008 | Bastien et al. | | |
| 7,940,934 B2* | 5/2011 | Buer | ................... | H04L 63/0428 380/277 |
| 2002/0178125 A1* | 11/2002 | Weigel | ................ | G06Q 20/085 705/75 |
| 2004/0060977 A1* | 4/2004 | Proennecke | ........... | G06Q 20/20 235/375 |
| 2005/0071651 A1* | 3/2005 | Aguilar, Jr. | ........... | G06F 21/602 713/189 |
| 2007/0156436 A1* | 7/2007 | Fisher | ................. | G06Q 20/102 455/552.1 |
| 2010/0053462 A1* | 3/2010 | Candelore | ............ | H04N 5/4403 348/734 |
| 2010/0250441 A1* | 9/2010 | Coppinger | ............. | G06Q 20/20 705/67 |
| 2011/0087610 A1* | 4/2011 | Batada | .................... | G06F 21/72 705/318 |
| 2011/0131638 A1 | 6/2011 | Kan | | |
| 2011/0173438 A1* | 7/2011 | Matzkel | ................ | H04L 9/0833 713/150 |
| 2012/0054498 A1* | 3/2012 | Rickman | ............... | G06F 21/606 713/183 |
| 2012/0226582 A1* | 9/2012 | Hammad | ................. | G06F 21/34 705/26.41 |
| 2013/0054417 A1* | 2/2013 | O'Donoghue | ......... | G06Q 20/02 705/26.43 |

* cited by examiner

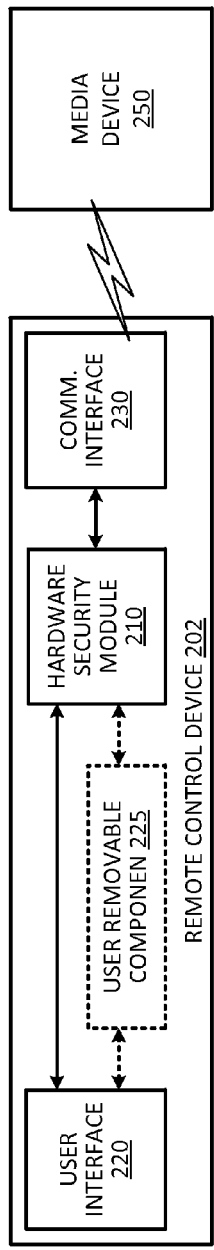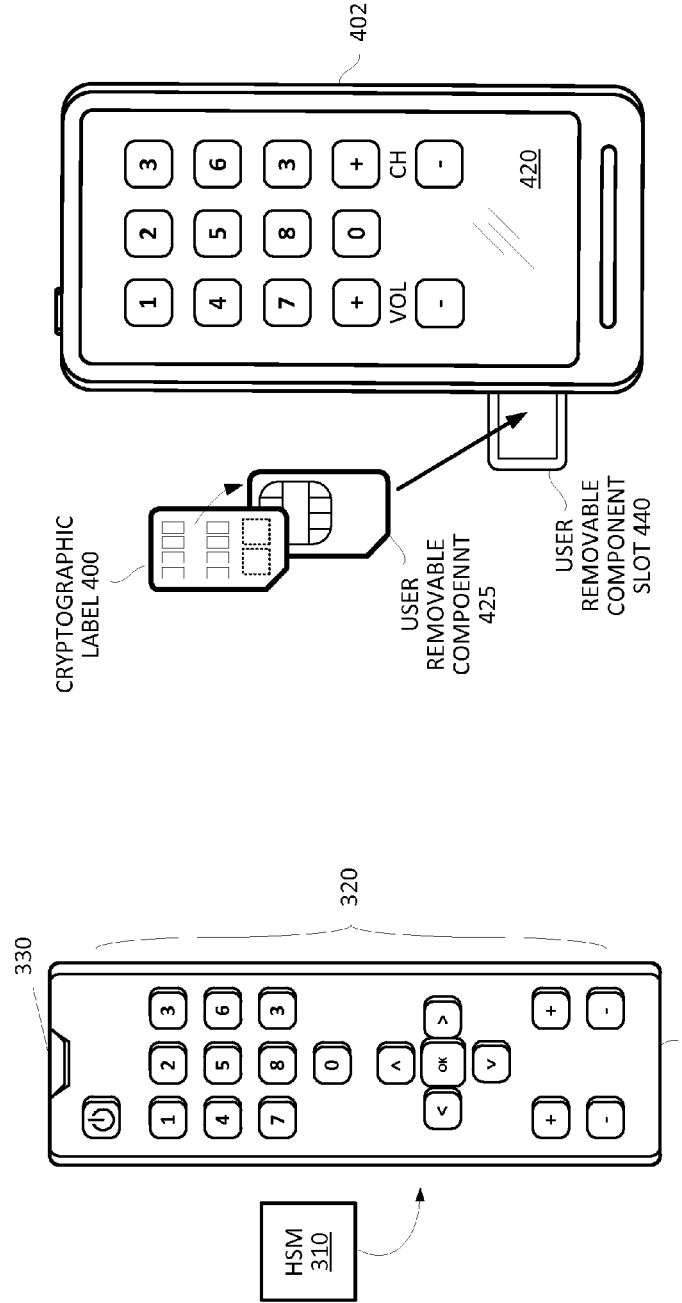

PIN ENTRY FOR INTERNET BANKING ON MEDIA DEVICE

CROSS-REFERENCES TO RELATED APPLICATIONS

This application is a 371 of international application No. PCT/US2013/032312 filed Mar. 15, 2013, which claims the benefit of U.S. Provisional Patent Application No. 61/611,792, filed Mar. 16, 2012, the contents of which are all herein incorporated by reference.

BACKGROUND

Advances in media device technology have enabled media devices such as televisions to have the capability to connect to the internet directly and to run multimedia applications that stream movies and music from online services through the internet-enabled television's internet connection. This capability has also allowed internet banking and payment transactions to be carried out on internet-enabled media devices. For example, a user can access an online banking website through the internet-enabled media device, and log on to the user's account to check the account balance. A user can also access a merchant's website through the internet-enabled media device to purchase goods and services.

While this capability provides a user with the convenience of performing financial related transactions from the living room through the web-enabled television without using a computer, the operating system (OS) of the television and the software applications running on that OS often lack sufficient security measures to ensure sensitive data such as a user's bank account credentials are adequately protected. For example, there is a lack of available anti-virus software programs and firewalls that can adequately protect the OS of the television from a malicious attack. As a result, it is possible that the OS of the television can be hacked and be high-jacked by malicious software sent to the web-enabled television through its internet connection. When a user enters the user's bank account credentials during an online banking session that is being conducted through the web-enable television, the account credentials can be captured by the malicious software and be transmitted to a third party through the web-enabled television's internet connection without the user's knowledge. Hence, there is an inherent risk that a user's bank account credentials can be comprised when a user conducts online banking through an unsecured and untrusted device such as the web-enabled television.

Embodiments of the present invention address these and other problems individually and collectively.

BRIEF SUMMARY

Embodiments of the present invention provides a remote control device that is used for controlling a media device (e.g., an internet enable television) with a hardware security module (HSM) to encrypt sensitive information inputted by a user on the remote control device when conducting financial transactions such as internet banking or purchases via the media device. By encrypting the sensitive information such as account numbers and PINs on the remote control device, the sensitive information can be sent securely to a server from the remote control device via the media device in an encrypted format. The sensitive information remains encrypted as it is being forwarded to the server by the media device. This reduces the risk that the sensitive information can be retrieved by malicious software that may have taken over control of the media device.

According to some embodiments, the remote control device includes a user interface to accept user input, and a communication interface to communicate with a media device. The remote control device also includes a hardware security module that is coupled to the user interface and the communication interface. The hardware security module includes a secure processing unit, and a public processing unit that is configured to selectively request the secure processing unit to encrypt the user input based on a function being performed on the media device.

According to some embodiments, a media system that can be used to conduct financial transactions include an internet-enabled media device and a remote control device for operating the internet-enabled media device. The remote control device includes a user interface to accept user input, a communication interface to communicate with the internet-enabled media device, and a hardware security module coupled to the user interface and the communication interface. The hardware security module selectively encrypts the user input received on the user interface based on a function that is being performed on the internet-enabled media device. The internet-enabled media device is configured to forward the encrypted user input in an encrypted format as it is transmitted from the remote control device to a server when the internet-enabled media device is being used to conduct a financial transaction.

According to some embodiments, a method for conducting a financial transaction on a media device using a remote control device includes receiving user input on the remote control device, and determining, by the remote control device, a function that is being performed on the media device. When a media function is being performed on the media device, the user input is transmitted in an unencrypted format to the media device. When a financial transaction is being performed on the media device, the user input received on the remote control device is encrypted by a hardware security module of the remote control device, and transmitted in the encrypted format to conduct the financial transaction.

BRIEF DESCRIPTION OF THE DRAWINGS

FIG. 2 illustrates a block diagram of a remote control device, according to some embodiments.

FIG. 3 illustrates a remote control device, according to some embodiments.

FIG. 4 illustrates another remote control device, according to some embodiments.

DETAILED DESCRIPTION

Figure 1:
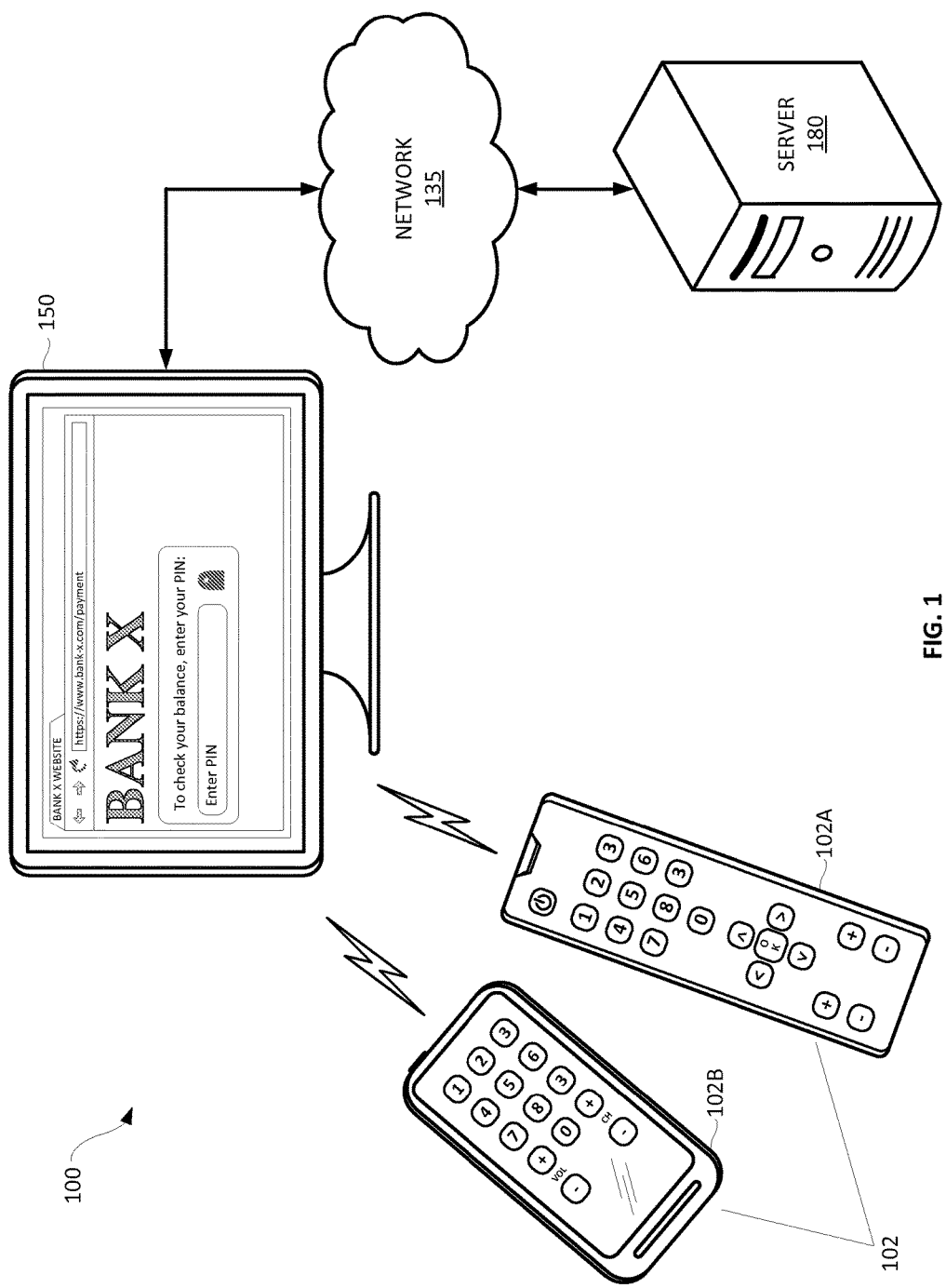
FIG. 1 illustrates a media system, according to some embodiments.

Embodiments of the present invention disclose devices, systems, and methods for securely conducting financial transactions on an internet-enabled media device using a remote control device. The remote control device according to embodiments of the invention includes a Federal Information Processing Standards (FIPS) compliant hardware security module (HSM) to provide the remote control device with the set of security features and functions as found in industry-standard HSMs. The HSM can be an integrated component of the remote control device, or can be a label that is attached to a user removable component of the remote control device such as a subscriber card or a memory card. Using the remote control device outfitted with the HSM, a user can securely send sensitive information in end-to-end secure communications from the remote control device to a server that is processing the financial transaction. The end-to-end secure communications remain encrypted while being forwarded to the server through the internet-enabled media device. Thus, even if the operating system or an application running on the media device is hijacked by malware or snooping software, only the encrypted version of the sensitive information, which is of little use to malicious parties, would be intercepted.

Examples of the security features that embodiments of the invention provide to the remote control device include running a secure operating system in the remote control device and secure key management related functions such as cryptographic key generation, configuration of security limits and capabilities of the cryptographic keys, cryptographic keys backup and recovery, secure cryptographic keys storage, and revocation and destruction of cryptographic keys. The remote control device can encrypt data using various encryption standards and protocols including but not limited to Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols. The remote control device can also generate and verify message authentication codes (MAC) and cryptographic hashes on communications sent to and from the remote control device.

It should be appreciated that the remote control device according to embodiments of the invention uses dedicated cryptographic hardware components provided in the HSM to perform cryptographic operations. This is different from software encryption technologies that use software with a general purpose processor to perform encryption, and provides enhanced security protection over such software encryption technologies. In some embodiments, the HSM in the remote control device is implemented as a dual processing units device that includes a FIPS compliant secure processing unit and a public processing unit. This division in hardware roles introduces an additional level of security by providing a physical and logical separation between interfaces that are used to communicate critical security parameters and other interfaces that are used to communicate other data. Furthermore, the remote control device can also be provided a tamper-resistant mechanism that provides a high risk of destroying components in the remote control device and the cryptographic keys stored therein, if any attempt is made to remove or externally access the HSM. In some embodiments, tampering of the HSM may render the entire remote control device useless for communicating with or controlling a media device.

As used herein, the term "secure communication" refers to a communication that includes at least some portion of the communication that is sent or received in an encrypted format. The term "secure operation" refers to a process or a function that involves performing one or more cryptographic operation. Examples of a "secure operation" can include sending or receiving of a secure or encrypted communication, or performing a financial or banking transaction with encrypted data or information. The term "cryptographic operation" refers to any of encryption, decryption, MAC generation or verification, hash generation or verification, and/or any of the functions provided by the HSM as described herein. The term "non-secure communication" refers to a communication that is sent or received in an unencrypted or plaintext form. The term "non-secure operation" refers to a process or a function that does not involve performing a secure operation.

As used herein, "account information" may include a numerical or alpha-numerical values such as a Primary Account Number (PAN) associated with a financial account such as a banking account or credit card account of a consumer (e.g., a user of a remote control device) issued by an issuer. Account information may also refer to a numerical or alpha-numerical values associated with a portable consumer payment device (e.g., debit/credit card) of the user. Account information can also be a Personal Identification Number (PIN) that is associated with a user account. Account information may also refer to a username and/or a password, or other user information that may be used to look up an account of a user, generate a request to withdraw funds, purchase goods or services, and perform other types of financial transaction. If a payment card is associated with a financial account, the account information may include card data such as an account number associated with the card, and expiration date associated with the card, verification values associated with the card, etc.

A "financial transaction" is a transaction that involves accessing a financial account of a user, such as making a payment, or buying or selling of goods or services or financial products such as stocks or commodities. A financial transaction can also be a banking transaction. A banking transaction can be an account inquiry that does not involve a payment such as checking account balance, checking credit limit, looking up transaction history, etc. A banking transaction can also include a payment transaction, a purchase, a money transfer, etc.

FIG. 1 illustrates a media system 100 that can be used for conducting a financial transaction according to some embodiments. Media system 100 includes a media device 150 and a remote control device 102. Media device 150 is an internet-enabled device that can connect to a network 160 to communicate with server 180. Remote control device 102 is a device that can be used by a user to control or operate media device 150, and can be remote control device 102A or remote control device 102B. Although two remote control devices are shown in FIG. 1 for illustrative purposes, it should be understood that just one remote control device is needed to control media device 150.

Network 160 can be any type of communication network, for example, an internet protocol (IP) network. Network 160 may include any number of network devices that can provide both wired and/or wireless connectivity to exchange communications between media device 150 and server 180. For example, network 160 may include any number of routers and/or repeaters. Network 160 may also include gateway devices that interfaces network 160 to other networks. In some embodiments, network 160 may include or be part of a cable or satellite communication network, or a mobile or wireless communication network.

Server 180 is a server computer such as a web server that can be accessed by media device 150 to conduct a financial transaction. Server 180 can be a server associated with a financial service provider, for example, a financial institution such as a bank or a brokerage firm through which financial transactions can be conducted, or an entity associated with a payment processing network such as \ an issuer of an account or an acquirer. A payment processing network may include data processing subsystems, networks, and operations used to support and deliver authorization services, exception file services, and clearing and settlement services. An exemplary payment processing network may include VisaNet™ Payment processing networks such as VisaNet™ are able to process credit card transactions, debit card transactions, and other types of commercial or financial transactions. Server 180 can also be a server associated with a merchant through which goods or services can be purchased.

As indicated above, media device 150 is an internet-enabled media device that can connect to network 160 to communicate with server 180. Media device 150 can be an internet-enabled display such as a television or a display monitor as shown, or other types of media device that is coupled to a display device, for example: an internet-enabled set-top box such as a cable receiver, a satellite receiver, or other types of receiver that can receive broadcasted media content or stream media content; an internet-enabled media player such as a video or audio player, a disk player, or other types of player that can play media content; an internet-enabled gaming console that allows users to play online video games; other types of internet-enabled consumer electronics that can be coupled to a display device or has an integrated display; or a device that is any combination therefore.

Media device 150 can perform media functions such as display or play media content, store or record media content, execute gameplay, stream media, and/or general web browsing, etc. In some embodiments, media device 150 can be used to perform or conduct financial transactions through the internet connection of media device 150. For example, media device 150 can be used to access a web page or a website of a bank, a financial institution, or a merchant that may be hosted on server 180 to check account balances, access banking services, buy or trade stocks, transfer money, or make a purchase. As used herein, a "media function" is any function that can be performed on media device 150, including general web browsing, that does not involve conducting a financial transaction.

Remote control device 102 is a device that can be used by a user to control or operate media device 150 by communicating wirelessly with media device 150. The wireless communications can be transmitted using radio frequency (RF) and/or infrared (IR), and in some embodiments, depending on the capabilities of the remote control device and the media device, can be transmitted according to a communication protocol such as WiFi, Bluetooth, 3G, Near Field Communication (NFC), etc., or a communication messaging protocol such as Short Message Service (SMS) or Unstructured Supplementary Service Data (USSD). Remote control device 102 can be a remote control that is provided by the manufacturer of media device 150, a universal remote control that can be programmed to be able to control \ media device 150 (e.g., remote control device 102A), or a portable communication device that can run a software application to enable the portable communication device to be used as a remote control (e.g., remote control device 102B). In embodiments in which media device 150 is a gaming console, remote control device 120 can be a game controller.

To conduct or perform a financial transaction on media device 150 using media system 100 according to various embodiments, a user can launch a web browser application on media device 150. The user can direct the web browser to a website or web page associated with a financial service provider or a merchant that the user intends to perform the financial transaction with. Media device 150 then establishes a connection to a server 180 through network 135 to enable the user to conduct a financial transaction. In some embodiments, a custom application provided by the financial service provider or the merchant can be used, and launching the custom application on media device 150 will take the user directly to the website of the financial service provider or the merchant.

According to some embodiments, upon accessing the website or web page of a financial service provider or a merchant, sever 180 may send, or request media device 150 to send, an encryption request signal to remote control device 102 to establish a secure session with remote control device 102 to conduct a financial transaction. The encryption request signal can also be sent to remote control device 102 by the custom application running on media device 150 automatically when the custom application is launched. In embodiments in which remote control device 102 can communicate using more than one communication technology (e.g., RF and IR), or more than one communication protocol, the encryption request signal can be sent to remote control device 102 using a different communication technology or protocol than what is normally used by remote control device 102 to control media device 150. For example, remote control device 102 may normally send commands to control the media functions of media device 150 using IR, and the encryption request signal can be transmitted to remote control device 102 using RF. As another example, remote control device 102 may normally send commands to control the media functions of media device 150 using RF, and the encryption request signal can be sent to remote control device 102 using SMS through a 3G or cellular network (e.g., by server 180).

Upon receiving the encryption request signal from media device 150 or from server 180, remote control device 102 will encrypt, using its HSM, user input received on remote control device 102. The user input may include any sensitive data or information that is used to carry out the financial transaction. The user input of sensitive data or information may include a sequence of keys or buttons pressed by a user, or speech provided by a user to a microphone of remote control device 102 if remote control device includes a microphone. The sequence of keys or buttons may include a sequence of numeric or alphanumeric keys or buttons pressed by a user, or may include other control keys or buttons that can be used to represent alphanumeric characters (e.g., symbol or control keys on a game controller), or any combination thereof. For example, the financial service provider or merchant website may request the user to enter account information such as an account number or a PIN on remote control device 102 to carry out a purchase, account inquiry, money transfer, etc. The account information entered by the user and received on the remote control device 102 will be encrypted by the HSM in remote control device 102, and transmitted to media device 150 in an encrypted format.

Media device 150 will then forward or pass through the account information in the encrypted format to server 180. Thus, sensitive data such as account information remains securely encrypted as it is sent end-to-end from remote control device 102 to server 180. Server 180 can then decrypt the encrypted user input to retrieve the sensitive data. According to some embodiments, media device 150 can be designed to lack any decryption capabilities that can be used to decrypt the encrypted sensitive data to ensure that media device 150 cannot be used to retrieve the sensitive data (e.g., when media device 150 has been taken over by malicious software). Once the user has completed the intended financial transaction, server 180 may send, or request media device 150 to send, an encryption disable signal to remote control device 102 to turn off encryption on remote control device 102. In this manner, remote control device 102 can be provisioned to selectively encrypt user input based on the particular function that is being performed on media device 150—that is, whether media device 150 is being used to conduct a financial transaction or is being used to perform other functions (i.e. media function) that does not involve conducting a financial transaction. Accordingly, the HSM of remote control device 102 does not encrypt normal operating commands such as volume adjustment or channel surfing, and does not interfere with the controlling of media functions of media device 150 from remote control device 102.

In some embodiments, the user input encrypted by the HSM may include all user input that is entered by the user while the web browser or custom application is pointed at the website of the financial service provider or merchant. This may include account information as described above, or login information (e.g., username and/or password) that the user enters to login to the online account of the website, as well as commands inputted by the user to navigate the website of the financial service provider or merchant. This allows the entire banking or purchase session to be conducted in an encrypted manner. When server 180 receives a command from the user indicating the user is terminating the banking or purchase session (e.g., navigating away from the website, or exiting the web browser or custom application), server 180 may send, or request media device 150 to send, an encryption disable signal to remote control device 102 to turn off decryption in remote control device 102.

In some embodiments, only selected user input is encrypted by remote control device 102. For example, the encryption request signal may be sent to remote control device 102 to turn on encryption only when the user accesses a form field on the website that is requesting sensitive data such as an account number or a PIN. When the user has finished entering the requested information (e.g., after the user has entered a predetermined number of digits), the encryption disable signal may be sent to remote control device 102 to turn off encryption. Thus, in such embodiments, remote control device 102 can be provisioned to selectively encrypt user input based not only on the particular function being performed on media device 150, but also on the particular type of information that is being requested by the website and/or being inputted by the user.

In some embodiments, remote control device 102 may include a user controllable physical or virtual switch or button that the user can use to manually enable encryption on remote control device 102 when a financial transaction is being conducted on media device 150, and to manually disable encryption on remote control device 102 when a media function is being performed on media device 150. In such embodiments, transmissions of the encryption request signal and the encryption disable signal can be eliminated.

FIG. 2 illustrates a block diagram of a remote control device 202 according to some embodiments. Remote control device 202 includes a user interface 220, a communication interface 230, and a hardware security module 210 coupled to user interface 220 and communication interface 230. In some embodiments as will be describe in more details below, remote control device 202 may further include a user removable component 225 that is communicatively coupled between user interface 220 and HSM 210. User interface 220 is used to accept or receive user input that can be used to control or operate media device 250. User interface 220 can include input controls such as a touch pad, touch screen, microphone, or virtual or physical scroll wheel, click wheel, dial, button, keypad, keyboard, etc., as well as output devices such as a display screen, indicator lights, speakers, headphone jacks, etc., together with supporting electronics (e.g., digital-to-analog or analog-to-digital converters, signal processors or the like). Thus, user input can take the form of pressing a physical button, touching a virtual button on a touch screen, speaking into a microphone, or other forms of engagement with any of the input controls.

Communication interface 230 provides an interface for remote control 202 to communicate with media device 250 and/or one or more communication networks. For example, communication interface 230 can incorporate a radio-frequency (RF) transceiver and suitable components for communicating over RF, and/or an infrared (IR) transceiver and suitable components for communicating over IR. Communication interface 230 can additionally or alternatively, incorporate a wireless connection to an IP network (e.g., a WiFi transceiver, 3G transceiver or the like), to a personal area network (e.g., a Bluetooth network), or any other network. Communication interface 230 can also include analog-to-digital and/or digital-to-analog circuitry, baseband processing components (e.g., codecs, channel estimators, and the like), modulators, demodulators, oscillators, amplifiers, transmitters, receivers, transceivers, internal and/or external antennas, and so on. Communication interface 230 can support one or more communication protocols such as WiFi, Bluetooth, 3G, Near Field Communication (NFC), etc., and/or one or more communication messaging protocols such as Short Message Service (SMS) or Unstructured Supplementary Service Data (USSD).

Hardware security module (HSM) 210 can provide and/or expand the capabilities of remote control device 202 to perform cryptographic operations to send and receive secure communications with a recipient device using communication interface 230. For example, HSM 210 can be used to encrypt user input received on user interface 220. According to some embodiments, HSM 210 includes a public processing unit and a secure processing unit. The public processing unit includes a processor that can be used to determine whether the user input received on user interface 220 should be encrypted or not, for example, based on the particular function being performed on media device 250.

The public processing unit can make this determination based on whether an encryption request signal has been received or whether a user has provided manual input (e.g., via a switch or button on user interface 220) to enable encryption on remote control device 202. When the public processing unit determines that the user input received on user interface 220 should be encrypted (e.g., during a financial transaction), the public processing unit can request the secure processing unit, which includes a cryptoprocessor, to encrypt the user input before transmitting the user input to media device 250 via communication interface 230. When the public processing unit determines that the user input received on user interface 220 should not be encrypted (e.g., when media device 250 is performing a media function), the public processing unit can pass through the user input, without encryption, from the user interface 220 to communication interface 230 for transmission to media device 250.

FIG. 3 illustrates a remote control device 302 according to one embodiment. Remote control device 302 can be a remote control device that is provided by the manufacturer of a media device or a universal remote control that can be programmed to communicate with one or more media devices. Remote control device 302 includes a communication interface 330 that can be used to transmit and/or receive communications with a media device. Communications interface 330 can include a RF transmitter and/or receiver, and/or an IR transmitter and/or receiver, and may support any of the communication standards or protocols described above that can be used to communicate with a media device. Remote control device 302 includes a user interface 320 which can include a set of physical keys or buttons as shown. Although user interface 320 is shown as including a keypad of numeric buttons, it should be understood that other embodiments may include other keys or buttons not shown, such as buttons for alphanumeric characters or other control buttons. In other embodiments, user interface 320 can be a touch screen that displays a virtual keypad or keyboard. In the embodiment as shown, HSM 310 is integrated into the remote control device 302. For example, HSM 310 may be soldered onto or otherwise attached to a circuit board of remote control device 302. Thus, remote control device 302 is manufactured to include an integrated HSM 310, and remote control device 302 is provided to a user with HSM 310 already embedded in remote control device 302.

FIG. 4 illustrates a remote control device 402 according to another embodiment. Remote control device 402 can be a portable communication device such as a mobile phone as shown, a tablet device, a personal digital assistant device, or the like that can run a software application to enable portable communication device to be used as a remote control to operate a media device. Remote control device 402 includes a communication interface (not shown) that can be used to communicate with a media device via RF or IR. Remote control device 402 includes a user interface 420 which can be a touch screen that can display a virtual keypad or keyboard as shown. In other embodiments, user interface 420 can include physical keys or buttons, keypad, or keyboard.

Remote control device 402 includes a user removable component 425. User removable component 425 includes circuitry and storage memory that can be used to facilitate the functionality of remote control device 402, and is a component that can easily be removed or installed by a user without complicated tools. For example, user removable component 425 can be a Subscriber Identity Module (SIM) card that can be easily inserted into or removed from remote control device 402 by a user via a removable component slot 440 (e.g., a SIM card slot).

When installed in remote control device 402, user removable component 425 is communicatively coupled to user interface 420 and to the communication interface remote control device 402. User input received on user interface 420 may direct remote control device 402 to execute applications stored in user removable component 425 such as executing a SMS application to send SMS messages on the communication interface of remote control device 402. Data or information stored in user removable component 425 such as subscriber information may be retrieved and used by remote control device 402 to facilitate communications sent to and from remote control device 402 or to facilitate access to subscribed services via remote control device 402.

According to some embodiments, instead of having an integrated HSM in the remote control device, a HSM 410 in the form of a cryptographic label 400 (e.g., an adhesive label or sticker) that can be attached to user removable component 425 of remote control device 402 can be used. In this manner, instead of having a manufacturer of the media device or remote control to provide a user with a remote control device having an integrated HSM, HSM 410 can be provided to the user by a separate entity such as a financial service provider or a merchant, and the user can install HSM 410 into remote control device 402 to enable remote control device 402 to perform encryption of user input when conducting a financial transaction through a media device.

In other embodiments, remote control device 402 can be a set-top box remote control or a game controller, etc., and the user removable component can be other types of subscribe card such as a satellite or cable television subscriber card, or a memory card that can be used to store information such as gameplay information and/or other user information.

Figure 5:
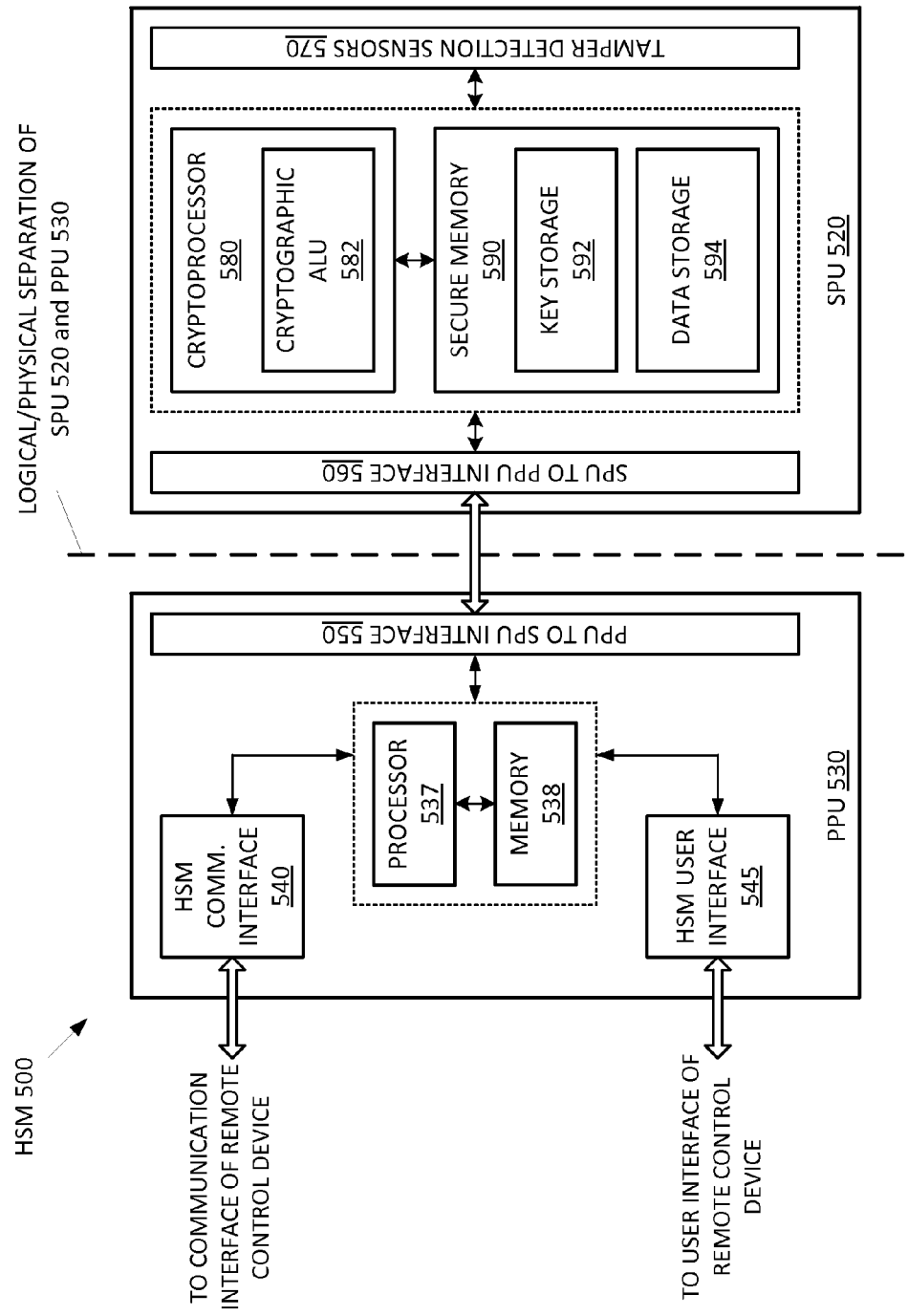
FIG. 5 illustrates a block diagram of a hardware security module, according to some embodiments.

FIG. 5 shows a block diagram illustrating the hardware components of a HSM 500, according to one embodiment. HSM 500 can be an integrated component of a remote control device, or a cryptographic label that can be attached to a user remove component of a remote control device. HSM 500 includes a public processing unit (PPU) 530, and a secure processing unit (SPU) 520 coupled to PPU 530. It should be noted that although SPU 520 is coupled to PPU 530, HSM 500 provides a logical and/or physical separation between SPU 520 and PPU 530. A "physical separation" refers to some physical boundary between SPU 520 and PPU 530. For example, SPU 520 and PPU 530 can be implemented with and manufactured as separate semiconductor dies or separately packaged semiconductor chips, and the physical boundary of the dies or chips can serve as the physical separation. A "logical separation" refers to the separation of the communication interface and storage memory between SPU 520 and PPU 530. As shown in FIG. 5, SPU 520 has its own communication interfaces 540, 545, and 550, which are separate from communication interface 560 of SPU 520. PPU 530 also has its own memory 538, which is separate from secure memory 590 of SPU 520. As will be explained below, the logical and/or physical separation provided between SPU 520 and PPU 530 creates a division in hardware roles to protect SPU 520 and the contents stored in secure memory 590 from unauthorized accesses.

According to some embodiments, PPU 530 includes processor 537, memory 538, a HSM communication interface 540, a HSM user interface 545, and a PPU-to-SPU interface 550. Processor 537 can be implemented as one or more processors or controllers. Memory 538 is coupled to processor 537, and provides storage to store data and executable code that when executed by processor 537, causes processor 537 to run an operating system (OS) and/or applications that can be complaint with Payment Card Industry (PCI) and International Organization for Standardization (ISO) standards to manage the functionality and operations of HSM 500, and to process the exchange of information between the various interfaces of PPU 530.

HSM communication interface 540 is communicatively coupled to the communication interface of a remote control device, and provides a set of signals that can include a clock signal and one or more data input/output (I/O) signals to send and receive commands and information between PPU 530 and the communication interface of the remote control device. HSM user interface 545 is communicatively coupled to the user interface of the remote control device and provides a set of signals that can include a clock signal and one or more data input/output (I/O) signals to send and receive commands and information between PPU 530 and the user interface of the remote control device. PPU-to-SPU interface 550 is coupled to SPU 520, and provides a set of signals that can include a clock signal and one or more data input/output (I/O) signals to send commands and information such as encryption and decryption requests to SPU 520, and to receive commands and information such as encryption and decryption results from SPU 520. Because of the logical and physical separation between SPU 520 and PPU 530, SPU 520 is exposed to PPU 530 only, and is not accessible to the communication device or to the communication component, except through PPU 530. Hence, PPU 530 can serve as a firewall or a gatekeeper to ensure unauthorized or unwanted communications such as hacking attempts are not sent to SPU 520.

According to some embodiments, SPU 520 includes cryptoprocessor 580, secure memory 590, and SPU-to-PPU interface 560. SPU 520 can also include tamper detection sensors 570. As mentioned above, SPU 520 is accessible from PPU 530 only, and receives commands and information from PPU 530 through SPU-to-PPU interface 560. SPU-to-PPU interface 560 provides a set of signals that can include a clock signal and one or more data input/output (I/O) signals coupled to PPU-to-SPU interface 550 that SPU 520 can use to communicate with PPU 530. In some embodiments, SPU 520 will only respond to encryption and decryption requests to perform cryptographic operations from PPU 530 received through SPU-to-PPU interface 560.

Cryptoprocessor 580 can be implemented as one or more cryptographic processors. A cryptographic processor is different from a general purpose processor in that a cryptographic processor includes dedicated circuitry and hardware such as one or more cryptographic arithmetic logic units (ALU) 582 that are optimized to perform computational intensive cryptographic functions. Cryptographic ALU 582 can include optimized pipelines and widen data buses to enable cryptoprocessor 580 to perform cryptographic operations faster and more efficiently than general purpose processors.

Secure memory 590 is coupled to cryptoprocessor 580, and can be partitioned into a cryptographic key storage 592 and a data storage 594. Data storage 594 can be read and written by cryptoprocessor 580, and provides storage memory to store user data such as data that are received on SPU-to-PPU interface 560 from PPU 530, and encryption and decryption results that are sent to PPU 530 through SPU-to-PPU interface 560. Cryptographic key storage 592 can be read-only to cryptoprocessor 580, and is used to store cryptographic keys and encryption algorithms. The cryptographic keys and algorithms stored in cryptographic key storage 592 are provisioned by the manufacturer during manufacturing of HSM 500, and cannot be altered by an external source without a master key that is only known to the manufacturer and/or authorized parties who are authorized to provision HSM 500. In some embodiments, the contents of cryptographic key storage 592 are never transmitted outside of SPU 520, and is inaccessible by PPU 530.

The cryptographic keys and algorithms stored in cryptographic key storage 592 can be provisioned to perform various encryption standards and protocols including but not limited to Advance Encryption Standard (AES), Data Encryption Standard (DES), Triple Data Encryption Standard/Algorithm (TDES/TDEA), Secure Socket Layer (SSL), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other encryption algorithms or protocols.

In some embodiments, SPU 520 may also include tamper detection sensors 570 to detect external attempts to tamper with HSM 500. For example, tamper detection sensors 570 may include temperature sensors to detect temperatures that may be indicative of someone attempting to desolder components of HSM 500, and/or mechanical sensors to sense structural changes to HSM 500 that may be indicative of someone attempting to dissect or cut open HSM 500. Tamper detection sensors 570 may also include electrical sensors to sense certain voltage, current, or impedance changes to the circuitry of HSM 500 that may be indicative of someone attempting to probe the components of HSM 500, and/or electromagnetic sensors to sense certain radiation such as X-rays that may be indicative of someone attempting to examine HSM 500. In some embodiments, tamper detection sensors 570 may include circuitry that can erase and whip out the contents of secure memory 590 to render SPU 520 and/or HSM 500 unusable in response to detecting an attempt to tamper with HSM 500. HSM 500 can also be configured with organic or soluble interconnects that can be dissolved by a solvent released by tamper detection sensors 570 in response to detecting an attempt to tamper with HSM 500.

Figure 6:
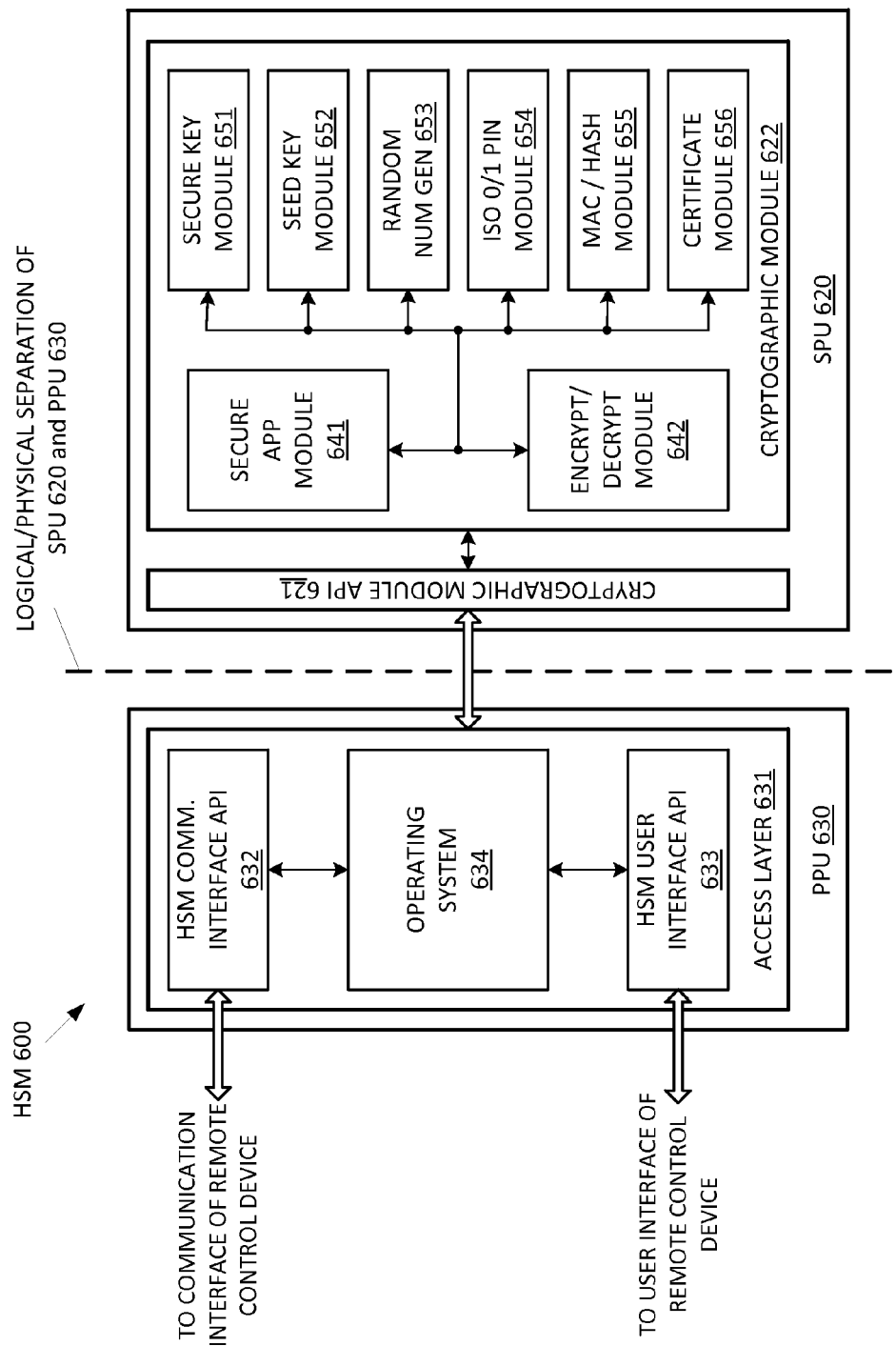
FIG. 6 illustrates a functional diagram of a hardware security module, according to some embodiments.

FIG. 6 shows a conceptual block diagram illustrating the functional features of a HSM 600, according to one embodiment. HSM 600 can be implemented with, for example, the hardware components described with reference to the HSM 500 of FIG. 5. PPU 630 of HSM 600 includes an operating system (OS) 634, a HSM communication interface API 632, and a HSM user interface API 633. OS 634, HSM communication interface API 632, and HSM user interface API 633 together form an access layer 631, which represents the publicly accessible portion of HSM 600. By "publicly accessible," it is meant that any device or components of a remote control device that can communicate directly with the communication interface of the remote control device or with the user interface of the remote control device would be able to send and receive commands and information to and from access layer 631.

HSM communication interface API 632 provides a programming interface to translate commands and information received from the communication interface of the remote control device (e.g., an encryption request signal, or an encryption disable signal) into instructions and data that OS 634 can process and execute, and vice versa. For example, HSM communication interface API 632 may translate an encryption request signal into an instruction for OS 634 to request SPU 620 to encrypt user input received on the user interface of the remote control device. HSM user interface API 633 provides a programming interface to translate commands and information received from user interface of remote control device into instructions and data that OS 634 can process and execute, and vice versa. For example, HSM user interface API 633 may translate a user's manual selection of enabling encryption via a switch or button on the user interface of the remote control device into an instruction for OS 634 to request SPU 620 to encrypt subsequent user input received on the user interface of the remote control device.

OS 634 manages the functionality and operations of HSM 600, and responds to commands and information from the communication interface of the remote control device and/or the user interface of the remote control device. The functionality and operations of HSM 600 that OS 634 can manage includes sending encryption and decryption requests to SPU 620 for secure communications sent to and from the communication interface of the remote control device, sending requests to SPU 620 to create or verify MAC or hash values for messages or portions of messages sent to and from a communication interface of the remote control device, providing certificates for HTTPS applications, storing encrypted communications history, providing basic encryption to external applications, and managing commands and information exchange through the various interfaces such as passing through user input from the user interface of the remote control device to the communication interface of the remote control device when the media device is performing media functions.

For example, in response to an encryption request signal received from the communication interface of the remote control device, OS 634 can send user input received on the user interface of the remote control to SPU 620 for encrypting. OS 634 can also issue commands to the communication interface and/or the user interface of remote control device, for example, commands to request the communication interface of the remote control device to send user input encrypted by SPU 620 to a media device.

For non-secure commands and information (i.e. commands and information that do not involve cryptographic operations, e.g., user input when media device is performing media functions), OS 634 can pass through or forward the user input received on the user interface of remote control device to the communication interface of the remote control device without modification or without encryption.

SPU 620 of HSM 600 includes a cryptographic module API 621 and cryptographic module 622. Cryptographic module API 631 provides a programming interface to translate commands and information received from OS 634 into instructions and data that cryptographic module 622 can process and execute, and vice versa. For example, OS 634 may send an encryption/decryption request to SPU 620, and cryptographic module API 631 may translate the encryption/decryption request into an encryption/decryption instruction for cryptographic module 622 to execute. In some embodiments, cryptographic module API 631 may also include, in the translated encryption/decryption instruction, which particular encryption algorithm cryptographic module 622 should use based on the particular application that is requesting the cryptographic operation.

According to various embodiments, cryptographic module 622 includes a secure application module 641, an encryption/decryption module 642, a secure key module 651, a seed key module 652, a random number generator 653, an ISO 0/1 PIN module 654, a MAC/HASH module 655, and a certificate module 656. In other embodiments, cryptographic module 622 may include additional modules to perform other cryptographic operations. Secure application module 641 can store one or more secure applications such as banking applications or payment applications. Secure application module 641 can also instruct encryption/decryption module 642 to perform specific cryptographic operations depending on the user selected function.

Encryption/decryption module 642 can store and execute various encryption algorithms such as Advance Encryption Standard (AES), Data Encryption Standard (DES), Triple Data Encryption Standard/Algorithm (TDES/TDEA), Blowfish, Serpent, Twofish, International Data Encryption Algorithm (IDEA), Rivest, Shamir, & Adleman (RSA), Digital Signature Algorithm (DSA), Tiny Encryption Algorithm (TEA), extended TEA (XTEA), and/or other cryptographic or encryption algorithms. In response to encryption and decryption requests from PPU 630 or from secure application module 641, encryption/decryption module 642 can look up the requested encryption algorithm, obtain any necessary keys from other modules in cryptographic module 622, perform the encryption/decryption request, and respond with the encrypted/decrypted data.

Secure key module 651 stores the set of cryptographic or encryption keys that are used in the various encryption algorithms performed by encryption/decryption module 642. The encryption keys can include symmetric keys and/or asymmetric keys. Seed key module 652 stores a set of seed keys that are used to initialize the encryption/decryption module 642 in certain encryption algorithms such as AES. Seed key module 652 also stores seed keys that are used by random number generator 653 to generate random numbers used in certain encryption algorithms such as RSA and DSA. The encryption keys stored in secure key module 651 and/or the seed keys stored in seed key module 652 are provisioned during manufacturing, and cannot be altered by an external source without a master key that was used during manufacturing to program cryptographic module 622. The encryption keys and seed keys can also be provisioned to be specific to a particular HSM, and hence the encryption keys and seed keys can be user-specific and unique to the user of HSM 600. One advantage of providing user-specific keys is that if the cryptographic keys stored in cryptographic module 622 is somehow compromised, the infiltration will be isolated to a single user, and the remaining user base of the mobile network will not be compromised. The affected user's keys can be changed without impacting the configuration of the remaining user base.

In some embodiments, cryptographic module 622 includes an ISO PIN module 654 to mask a user's PIN entry into the remote control device and to generate PIN blocks (e.g., ISO format 0/1 PINs) in accordance with ISO 9564 standard. The PIN blocks generated by ISO PIN module 654 stores PINs in an encrypted format that are used to verify a user's identity in financial transactions. The encrypted PINs stored in the PIN blocks of ISO PIN module 454 can be passed from SPU 620 to PPU 630 to be included in secure communications sent from the remote control device. It should be noted that the PINs stored in ISO PIN module 654 are never stored in plaintext form, but are instead stored in an encryption format.

Cryptographic module 622 also include Message Authentication Code (MAC)/Hash module 655 to generate and verify MACs and/or hashes for secure communications sent to and from the remote control device. A MAC or a hash can be generated for a message or a portion of the message such that the recipient can verify the message's data integrity and authenticity. Cryptographic module 622 can also include a certificate module to provide certificates such as Transport Layer Security (TLS) and Secure Sockets Layer (SSL) certificates used to verify a user's identity in Hypertext Transfer Protocol Secure (HTTPS) applications.

Figure 7:
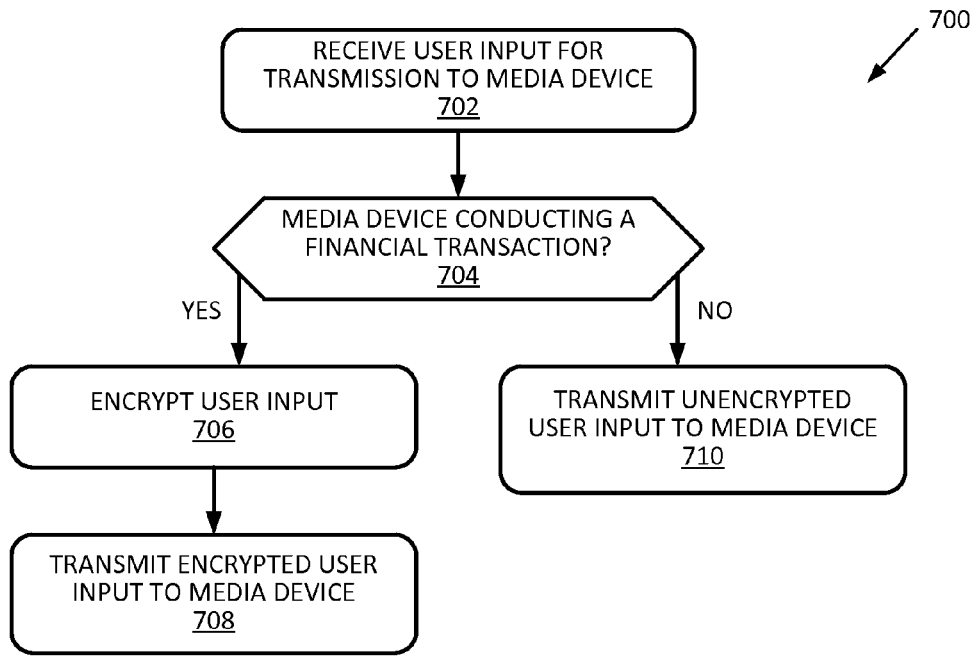
FIG. 7 illustrates a flow diagram of a method that can be performed in a remote control device for conducting a financial transaction, according to some embodiments.

FIG. 7 illustrates a flow diagram 700 of a method that can be performed in a remote control device for operating a media device to conduct financial transactions securely, according to some embodiments. At block 702, the remote control device receives user input for transmission to a media device. At block 704, the remote control device determines if the media device is being used to conduct a financial transaction or if media device is performing a media function.

This determination can be made in any number of ways. For example, the remote control device can determine that the media device is being used to conduct a financial transaction if the remote control device receives an encryption request signal from the media device or from a server that was sent to the remote control device in response to the media device accessing a website of a financial service provider or a merchant, or in response to the media device launching a custom application for conducting financial transactions. Alternatively, the remote control device can determine that the media device is being used to conduct a financial transaction if a user's manual input on the remote control device requests encryption to be turned on in the remote control device.

If the remote control device has not yet received an encryption request signal, or if an encryption disable signal is received following an encryption request signal, the remote control device can determine that the media device is performing a media function. Alternatively, if the remote control device has not yet received user input to turn on encryption or receives user input to turn off encryption, the remote control device can determine that the media device is performing a media function.

If it is determined that the media device is being used to conduct a financial transaction, the remote control device encrypts user input received on the user interface of the remote control device at block 706. Encryption of user input is performed until the remote control device receives an encryption disable signal or user input to disable encryption. Alternatively, the remote control device can be programmed to automatically turn off encryption after a predetermined number of keys or buttons on the remote control device have been pressed by a user. For example, this predetermined number of keys or buttons can be four keys or buttons to correspond to a four digit PIN number. At block 708, the encrypted user input is transmitted to the media device to conduct the financial transaction. If it is determined that the media device is not being used to conduct a financial transaction (e.g., media device is perform a media function), then the remote control device transmits the received user input unencrypted to the media device.

Figure 8:
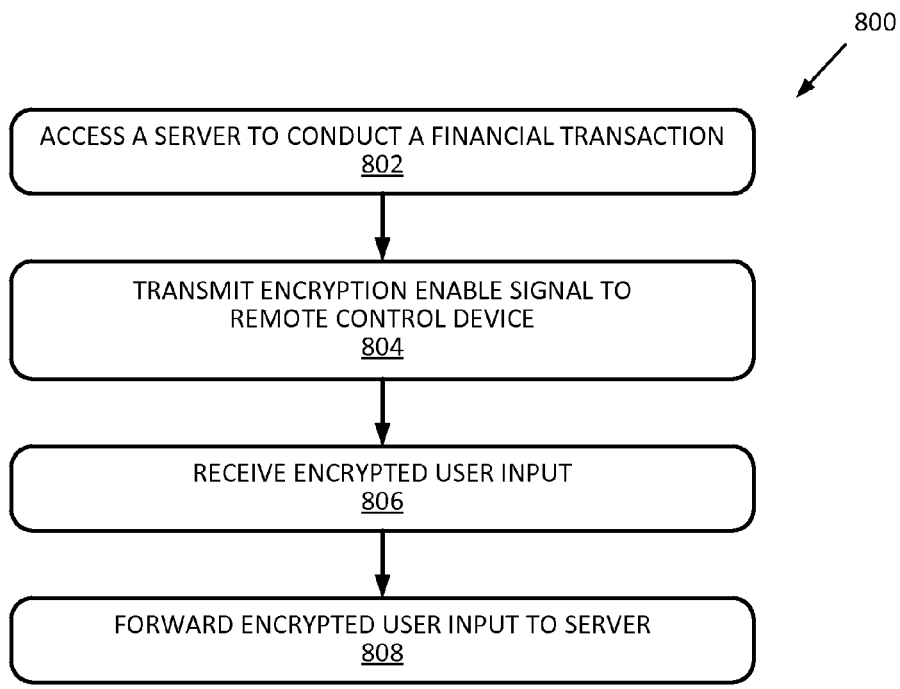
FIG. 8 illustrates a flow diagram of a method that can be performed in a media device for conducting a financial transaction, according to some embodiments.

FIG. 8 illustrates a flow diagram 800 of a method that can be performed in a media device to conduct financial transactions securely, according to some embodiments. At block 802, the media device accesses a server to conduct a financial transaction. The server can be associated with a financial service provider or a merchant, and the media device may access the server using a web browser or a custom application provide by the financial service provider or a merchant. At block 804, the media device transmits an encryption enable signal to the remote control device to turn on encryption on the remote control device. At block 806, the media device receives encrypted user input from the remote control device. At block 808, the media device forwards or passes through the encrypted user input as received from the remote control to the server to conduct the financial transaction. In some embodiments, the media device can be designed to be without decryption capabilities such that the encrypted user input cannot be decrypted by the media device. After the financial transaction is completed, or when the media device navigates away from the website of the financial service provider or the merchant, or when the web browser or custom application is exited, the media device can send an encryption disable signal to the remote control device to turn off encryption on the remote control device.

In some embodiments, individual blocks (or steps) of the processes described above with respect to the figures may be combined, eliminated, or reordered. Furthermore, any of the processes may include additional and/or intervening blocks (or steps).

Figure 9:
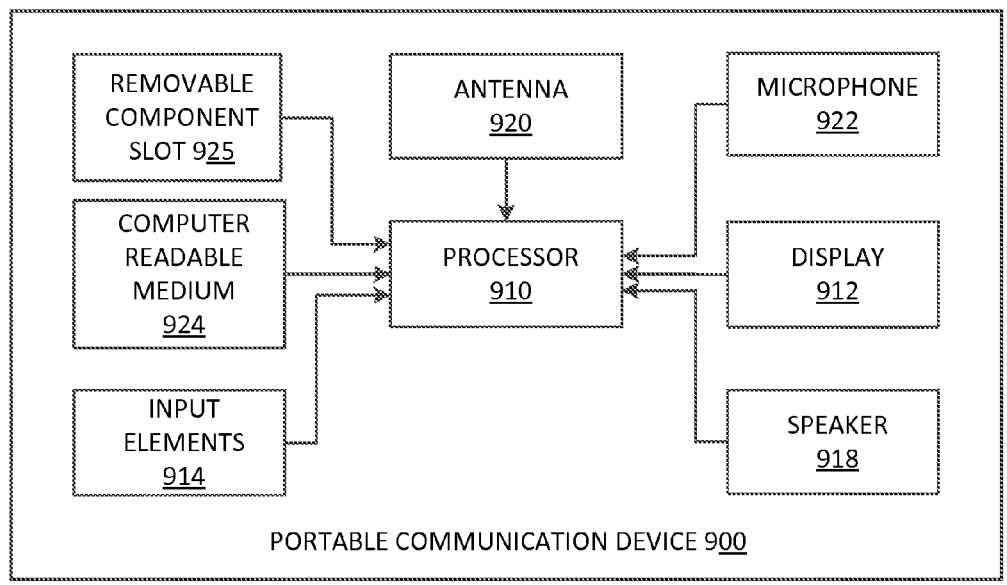
FIG. 9 illustrates a block diagram of a portable communication device, according to some embodiments.

FIG. 9 shows a portable communication device 900 according to the some of the embodiments described above. The portable communication device 900 includes a user removable component slot 925 for accepting a user removable component such as a SIM card. The portable communication device 900 also includes a display 912, input elements 914 (e.g., keypad), computer readable medium 924 such as volatile and non-volatile memory, processor 910 and at least one antenna 920. Portable communication device 900 may be capable of communicating through a cellular network, a wireless provider network, or a mobile operator network, such as GSM through antenna 920, for example to send and receive Short Message Service (SMS) messages or Unstructured Supplementary Service Data (USSD) messages. Portable communication device 900 may be capable of transmitting and receiving information wirelessly through both short range NFC, radio frequency (RF), infrared (IR), and cellular connections. In some embodiments, portable communication device 900 may have cryptographic capabilities to send encrypted messages and/or communications, and/or messages protected with message authentication codes or hash codes.

The various participants and elements described herein with reference to FIG. 1 may operate one or more computer apparatuses to facilitate the functions described herein. Any of the elements in FIG. 1, including any servers or databases, may use any suitable number of subsystems to facilitate the functions described herein.

Figure 10:
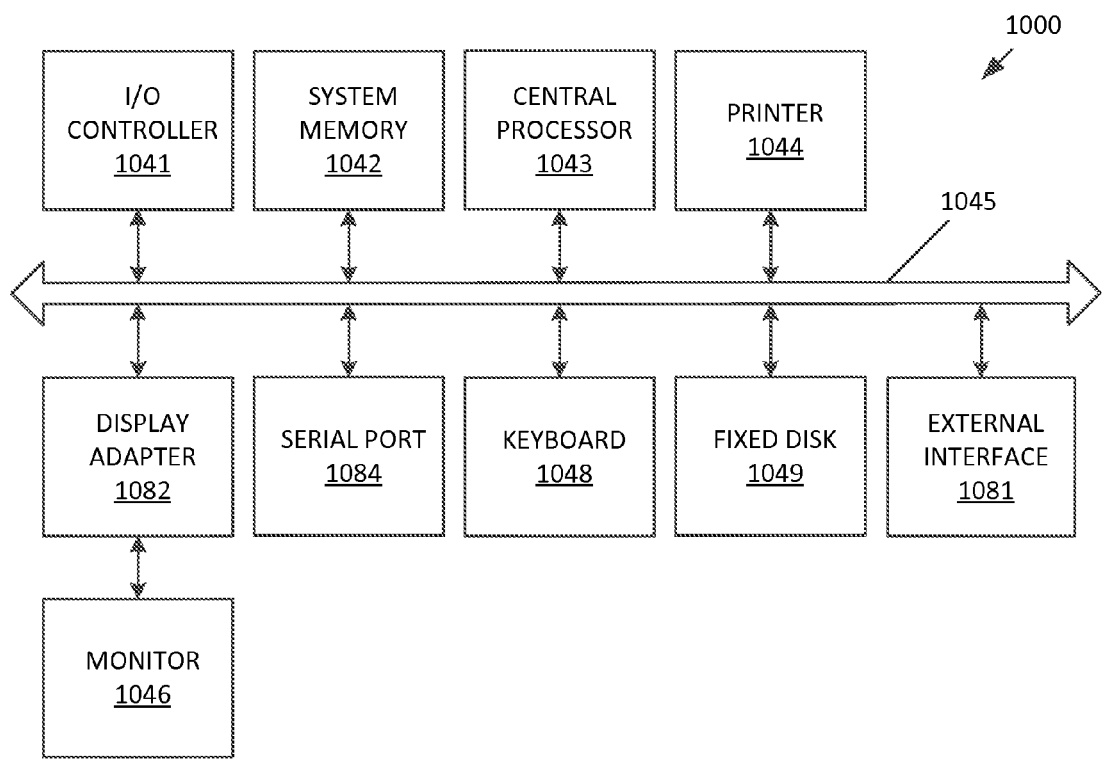
FIG. 10 illustrates a block diagram of a computer system, according to some embodiments.

Examples of such subsystems or components are shown in FIG. 10. The subsystems shown in FIG. 10 are interconnected via a system bus 1045. Additional subsystems such as a printer 1044, keyboard 1048, fixed disk 1049 (or other memory comprising computer readable media), monitor 1046, which is coupled to display adapter 1082, and others are shown. Peripherals and input/output (I/O) devices, which couple to I/O controller 1041 (which can be a processor or other suitable controller), can be connected to the computer system by any number of means known in the art, such as serial port 1084. For example, serial port 1084 or external interface 1081 can be used to connect the computer apparatus to a wide area network such as the Internet, a mouse input device, or a scanner. The interconnection via system bus allows the central processor 1043 to communicate with each subsystem and to control the execution of instructions from system memory 1042 or the fixed disk 1049, as well as the exchange of information between subsystems. The system memory 1042 and/or the fixed disk 1049 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A remote control device for operating a media device, the remote control device comprising:
   a user interface programmed to accept user input;
   a communication interface including a first transceiver utilizing a first communication technology and a second transceiver utilizing a second communication technology that is different than the first communication technology; and
   a hardware security module coupled to the user interface and the communication interface, wherein the hardware security module comprises at least two components, the at least two components including a cryptoprocessor and a processor,
   wherein the first transceiver utilizing the first communication technology is programmed to receive an encryption request from the media device in response to the media device accessing a form field that is requesting sensitive data,
   wherein the processor of the hardware security module is programmed to selectively request the cryptoprocessor of the hardware security module to encrypt the user input in response to the encryption request from the media device,
   wherein the cryptoprocessor is programmed to encrypt the user input in response to the request from the processor of the hardware security module,
   wherein the second transceiver is programmed to transmit the encrypted user input to the media device using the second communication technology that is different than the first communication technology,
   wherein the first transceiver is programmed to receive an encryption disable signal from the media device after a predetermined number of characters have been entered into the form field, and
   wherein the processor of the hardware security module is programmed to pass through the user input without encryption in response to the encryption disable signal.

2. The remote control device of claim 1, wherein the processor is programmed to request the cryptoprocessor to encrypt the user input when the media device is being used to transmit account information to a server.

3. The remote control device of claim 2, wherein the second transceiver is programmed to transmit, to the server via the media device, the encrypted user input without being decrypted in the media device.

4. The remote control device of claim 1, wherein the media device is a display device, a set-top box, a media player, or a gaming console.

5. The remote control device of claim 1, wherein the remote control device is a portable communication device.

6. A media system comprising:
   an internet-enabled media device; and
   a remote control device for operating the internet-enabled media device, the remote control device comprising:
   a user interface programmed to accept user input;
   a communication interface including a first transceiver utilizing a first communication technology and a second transceiver utilizing a second communication technology that is different than the first communication technology; and
   a hardware security module coupled to the user interface and the communication interface, wherein the hardware security module comprises at least two components, the at least two components including a cryptoprocessor and a processor,
   wherein the first transceiver utilizing the first communication technology is programmed to receive an encryption request signal from the internet-enabled media device in response to the internet-enabled media device accessing a form field that is requesting sensitive data,
   wherein the processor of the hardware security module is programmed to selectively request the cryptoprocessor of the hardware security module to encrypt the user input in response to the encryption request signal from the internet-enabled media device,
   wherein the hardware security module is programmed to selectively encrypt the user input in response to the encryption request signal from the internet-enabled media device,
   wherein the second transceiver is programmed to transmit the encrypted user input to the internet-enabled media device using the second communication technology that is different than the first communication technology, and the internet-enabled media device is programmed to forward the encrypted user input in an encrypted format as transmitted from the remote control device to a server,
   wherein the first transceiver is programmed to receive an encryption disable signal from the internet-enabled media device after a predetermined number of characters have been entered into the form field, and
   wherein the processer of the hardware security module is programmed to pass through the user input without encryption in response to the encryption disable signal.

7. The media system of claim 6, wherein the hardware security module is programmed to encrypt the user input when the internet-enabled media device is being used to conduct a financial transaction.

8. The media system of claim 7, wherein the internet-enabled media device is programmed to transmit the encryption request signal to the remote control device when the internet-enabled media device is being used to conduct the financial transaction.

9. The media system of claim 6, wherein the internet-enabled media device is a display device, a set-top box, a media player, or a gaming console.

10. The media system of claim 6, wherein the remote control device is a portable communication device.

11. The remote control device of claim 1, wherein at least one of the first transceiver or the second transceiver is a radio frequency transceiver.

12. The remote control device of claim 11, wherein the first transceiver is a radio frequency transceiver, and the second transceiver is an infrared transceiver.

13. The remote control device of claim 1, wherein the cryptoprocessor is coupled to the communication interface and the user interface via the processor such that the cryptoprocessor is accessible only through the processor of the hardware security module.

14. The media system of claim 6, wherein the cryptoprocessor is coupled to the communication interface and the user interface via the processor such that the cryptoprocessor is accessible only through the processor of the hardware security module.

15. The media system of claim 14, wherein the processor is coupled to a memory in a public processing unit of the hardware security module, the cryptoprocessor is coupled to a secure memory in a secure processing unit of the hardware security module, and the processor and the memory of the public processing unit are physically and logically separated from the cryptoprocessor and the secure memory of the secure processing unit.

16. The remote control device of claim 1, wherein the sensitive data is an account identifier.

17. The media system of claim 6, wherein the sensitive data is a PIN.

* * * * *